(12) United States Patent
Ota (10) Patent No.: US 8,695,784 B2
(45) Date of Patent: Apr. 15, 2014

(54) CHAIN CONVEYOR APPARATUS

(71) Applicant: Tsubakimoto Chain Co., Osaka (JP)

(72) Inventor: Keiko Ota, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 13/896,307

(22) Filed: May 16, 2013

(65) Prior Publication Data

US 2013/0319830 A1    Dec. 5, 2013

(30) Foreign Application Priority Data

Jun. 4, 2012   (JP) ................................ 2012-127247

(51) Int. Cl.
| | |
|---|---|
| *B65G 17/08* | (2006.01) |
| *B65G 54/02* | (2006.01) |
| *B65G 21/20* | (2006.01) |
| *B65G 47/26* | (2006.01) |
| *B65G 47/88* | (2006.01) |

(52) U.S. Cl.
CPC ................ *B65G 17/08* (2013.01); *B65G 54/02* (2013.01); *B65G 21/2018* (2013.01); *B65G 47/266* (2013.01); *B65G 47/268* (2013.01); *B65G 47/8807* (2013.01); *B65G 47/8815* (2013.01); *B65G 47/8823* (2013.01)
USPC ...................... 198/690.1; 198/459.6; 198/853

(58) Field of Classification Search
CPC .... B65G 17/08; B65G 54/02; B65G 21/2018; B65G 47/266; B65G 47/268; B65G 47/8807; B65G 47/8815; B65G 47/8823
USPC ........... 198/459.6, 619, 690.1, 805, 850, 851, 198/853
See application file for complete search history.

(56) References Cited

U.S. PATENT DOCUMENTS

| | | | | |
|---|---|---|---|---|
| 2,344,975 | A | | 3/1944 | De Back |
| 4,586,601 | A | * | 5/1986 | Hodlewsky ................ 198/690.1 |
| 4,850,542 | A | * | 7/1989 | Rechsteiner ............... 242/434.1 |
| 6,318,544 | B1 | * | 11/2001 | O'Connor et al. ............ 198/853 |
| 6,938,751 | B1 | | 9/2005 | Eubanks et al. |
| 7,198,148 | B1 | * | 4/2007 | Witkus .......................... 198/845 |
| 8,434,613 | B2 | * | 5/2013 | Ozaki ........................... 198/853 |
| 2008/0121498 | A1 | * | 5/2008 | Costanzo et al. ............. 198/779 |
| 2012/0073938 | A1 | * | 3/2012 | Ozaki et al. ................ 198/690.1 |

FOREIGN PATENT DOCUMENTS

| | | |
|---|---|---|
| JP | 2012-030936 | 2/2012 |
| JP | 2012030936 | 2/2012 |

OTHER PUBLICATIONS

European Patent Office, Extended European Search Report, Aug. 19, 2013, pp. 1-5, Application No. 13167444.2-1707, Applicant: Tsubakimoto Chain Co.

* cited by examiner

*Primary Examiner* — Leslie A Nicholson, III
*Assistant Examiner* — Keith R Campbell
(74) *Attorney, Agent, or Firm* — Woodling, Krost and Rust (57) ABSTRACT

There is provided a chain conveyor apparatus that realizes an accumulation operating environment that allows metallic articles to be readily and temporarily dammed up and retained at an accumulation position. Reduced power is required to operate the conveyor chain. Articles are attracted to and retained on the conveyor by using the magnetic force of magnet pieces. Attraction detaching pieces are built in rows of synthetic resin link modules to detach and release the articles. A projection driving mechanism is provided along a straight area on an inner circumferential side of the conveyor chain to project the attraction detaching pieces in and out of a loading surface of the rows of synthetic resin link modules.

4 Claims, 10 Drawing Sheets

FIG. 12

US 8,695,784 B2

CHAIN CONVEYOR APPARATUS

CROSS REFERENCE TO RELATED APPLICATIONS

The disclosure of Japanese Patent Application No. 2012-127247, filed on Jun. 6, 2012, and on which this application claims priority, is incorporated by reference.

FIELD OF THE INVENTION

This invention relates to a chain conveyor apparatus for loading and conveying articles to be conveyed (referred to simply as "articles" hereinafter). More specifically, the invention relates to a chain conveyor apparatus for loading articles such as metallic mechanical parts and bakery trays by securely attracting and retaining the articles by magnetism even in a condition in which a loading surface is inclined or is slippery.

BACKGROUND OF THE INVENTION

A known chain conveyor apparatus uses a conveyor chain composed of a large number of conveying link modules. Each link module has a loading surface for loading articles. Each link module has hinge knuckles projecting from front and rear ends of the loading surface. Link pins connect the link modules in a chain width and longitudinal directions. Each link module includes a large number of magnetism generating link modules each disposed on a side of the link modules along the chain longitudinal direction through an extension of the link pin as disclosed in Japanese Patent Application Laid-open No. 2012-30936 (claims, FIG. 2) for example.

Such chain conveyor apparatus conveys articles while attracting and retaining the articles on the loading surface of a loading portion by magnetism of magnet pieces even if the loading surface is inclined or is slippery due to food oil or machining oil.

However, the prior art chain conveyor apparatus has a problem. In the prior art chain conveyor it is necessary to forcibly detach the articles from the attractive force of the magnet pieces to dam up the articles, i.e., to temporarily retain the articles when other articles are to be accumulated on the way to a conveying area of the conventional chain conveyor apparatus. At this time, a force in a direction opposite to the conveying direction is generated in an attempt to dam up the articles and act on the traveling conveyor chain such that the power applied to the traveling conveyor chain increases due the force generated in damming up the articles.

The conventional chain conveyor apparatus has another problem. Namely, the force generated in damming up the articles forcibly acts between the loading surface of the traveling conveyor chain and a bottom surface of the articles to be accumulated. The conveyor chain travels while in slidable contact with the whole bottom surface of the articles and is prone to wear the whole bottom surface of the articles.

Accordingly, there is a need for a chain conveyor apparatus that simply accommodates an accumulation of articles and for readily temporarily damming them up and retaining them at an accumulation position such as an inclined conveying area. There is a further need for a chain conveyor apparatus which operates on reduced power.

SUMMARY OF THE INVENTION

According to a first aspect of the invention, there is provided a chain conveyor apparatus including a conveyor chain composed of a large number of synthetic resin link modules. Each synthetic resin link module has:
a loading portion for loading articles;
hinge knuckles projecting from front and rear ends of the loading portion;
link pins inserted into the hinge knuckles of the link modules to connect the link modules in a chain extending in the longitudinal direction;
magnet pieces built in the conveyor chain to convey the articles by attaching them to the surface of the synthetic resin link modules by the magnetic force of the magnet pieces;
attraction detaching pieces built in the plurality of synthetic resin link modules to detach and release the articles attracted and retained by the magnetism by pushing up the articles from the loading surface; and,
a projection driving mechanism provided in a straight area on an inner circumferential side of the conveyor chain along the chain longitudinal direction to project the attraction detaching pieces in and out of the loading surface of the synthetic resin link module.

According to a second aspect of the invention, the synthetic resin link modules have slide groove portions for sliding both right and left ends of the attraction detaching piece from a side of a back surface to a side of the loading surface within the synthetic resin link modules.

According to a third aspect of the invention, the projection driving mechanism is composed of a plurality of fixed guide rails spaced from each other in parallel on the inner circumferential side of the conveyor chain along the chain longitudinal direction. The guide rails enable the conveyor chain to slidably travel there along. A movable push-up rail is disposed across the fixed guide rails so as to be able to push up the attraction detaching pieces disposed between these fixed guide rails from the surface of the synthetic resin link modules. The synthetic resin link modules are arranged in rows.

The conveyor chain includes a longitudinal direction. The conveyor chain includes a plurality of synthetic resin link modules. The plurality of synthetic resin link modules is arranged in a plurality of rows. The plurality of rows of synthetic resin link modules is articulately connected to each other in the longitudinal direction enabling the rows to form a flexional circumferential bend having a flexional inner circumferential side and flexional outer circumferential side. Each of the plurality of rows of the synthetic resin link modules includes a flexional inner circumferential side residing during bending on the flexional inner circumferential side of the bend.

Each of the plurality of rows of the synthetic resin link modules includes an outer circumferential side residing during bending on the outer flexional circumferential side of the bend. Each of the rows of the synthetic resin link modules includes a surface for loading articles thereon.

According to a fourth aspect of the invention, the magnet piece resides in the synthetic resin link module and does not contact the article.

The chain conveyor apparatus of the invention includes the conveyor chain having a large number of synthetic resin link modules. Each of the synthetic resin link modules is arranged in a row and includes a loading surface and a loading portion for loading articles. Each of the synthetic resin link modules includes hinge knuckles projecting from the front and rear ends of the loading portion. Link pins are inserted into the hinge knuckles of the link modules to connect the link modules in the chain longitudinal direction. Magnet pieces reside in the conveyor chain to convey the articles while attracting and retaining the articles on the loading surface of the synthetic resin link modules by the magnetic force of the magnet pieces. It is possible to convey articles such as metallic mechanical parts and bakery trays loaded on the conveyor chain by securely attracting and retaining the articles on the loading surface of the conveyor chain by the magnetism of the magnet pieces even if the loading surface is inclined upwardly, downwardly or is slippery. The conveyor may be slippery due to food oil, machining oil and other substances. The following remarkable effects of the invention are stated.

That is, according to the first aspect of the invention, the chain conveyor apparatus further includes the attraction detaching pieces which reside in the plurality of synthetic resin link modules to detach and release the articles. Magnets in the conveyor chain attract and retain the metallic articles. The metallic articles are released from the conveyor chain by pushing up/urging the articles away from engagement with the loading surface of the rows of the synthetic resin link modules. The projection driving mechanism provided in the straight area (or straight portion) on the inner circumferential side of the conveyor chain along the chain longitudinal direction projects or protrudes the attraction detaching pieces in and out of the loading surface of the rows of synthetic resin link modules.

With this arrangement, the projection driving mechanism projects the attraction detaching piece, and the attraction detaching pieces detach and release the articles from the surface of the conveyor chain. The projection driving mechanism pushes up the articles from the loading surface and allows the articles to accumulate, i.e., temporarily retaining the articles on an inclined conveying area for example.

Accordingly, it is possible to dam up and to simply and temporarily retain the articles by using a blocking means such as a stopper at an accumulation position such as the inclined conveying area. When the articles are dammed up and retained, the necessary power applied to the conveyor chain is reduced because the load on the conveyor is reduced by the temporary removal of the metallic articles from the conveyor.

The attraction detaching pieces are built in the rows of the synthetic resin link modules. The projection driving mechanism is built in the straight area on the inner circumferential side of the conveyor chain. It is not necessary to provide a space for installing the attraction detaching pieces and the projection driving mechanism separately on the loading surface of the conveyor chain or in a straight area on the outer circumferential side of the conveyor chain, which thus allows the accumulation operating environment to be realized easily and simply.

According to the second aspect of the invention, rows of synthetic resin link modules have slide groove portions which allow sliding of both the right and left ends of the attraction detaching pieces from the side of the back surface of the modules to the side of the loading surface of the modules within the rows of the synthetic resin link modules.

With this arrangement, synergistically with a self-lubricant function of the synthetic resin link modules, the attraction detaching piece can be smoothly pushed out of the loading surface of the conveyor chain at a predetermined accumulation position across the chain width direction. When the attraction detaching piece is pushed out of the loading surface (for example, extends out of the loading surface or protrudes out of the loading surface), the metallic articles are instantly detached and released from the loading surface.

According to the third aspect of the invention, the projection driving mechanism is composed of the plurality of fixed guide rails spaced from each other in parallel on the inner circumferential side of the conveyor chain along the chain longitudinal direction which allows the conveyor chain to slidably travel over the guide rails. The movable push-up rail is disposed across the fixed guide rails so as to be able to push up the attraction detaching pieces disposed between the fixed guide rails from the loading surface of the rows of the synthetic resin link modules.

With this arrangement, even if the conveyor chain rises and falls in the straight conveying area by being affected by a polygonal movement caused by engagement with the driving sprocket, the fixed guide rails steadily receive and support the traveling conveyor chain. Accordingly, the movable push-up rail can project the attraction detaching pieces in and out of the loading surface of the rows of synthetic resin link modules between the fixed guide rails and can release the metallic article loaded on the conveyor chain.

According to the fourth aspect of the invention, the magnet piece is built in the rows of synthetic resin link modules and is not in contact with the article. With this arrangement, the loading surface of the rows of synthetic resin link modules is flat so that the articles can be conveyed stably.

Further features of the present invention will become apparent from the following description of exemplary embodiments with reference to the attached drawings.

DESCRIPTION OF PREFERRED EMBODIMENTS (First Embodiment)

A chain conveyor apparatus 100 of a first embodiment of the invention will be described below with reference to the drawings.

Figure 1:
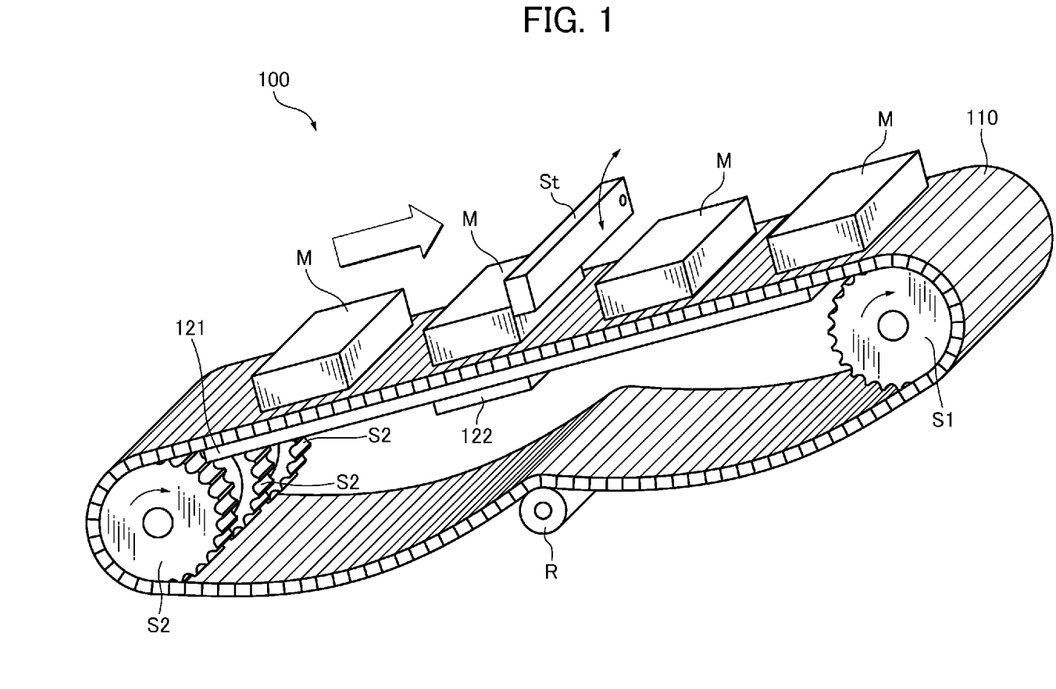
FIG. 1 is a general view showing a mode of use of a chain conveyor apparatus of a first embodiment of the invention.
Figure 2:
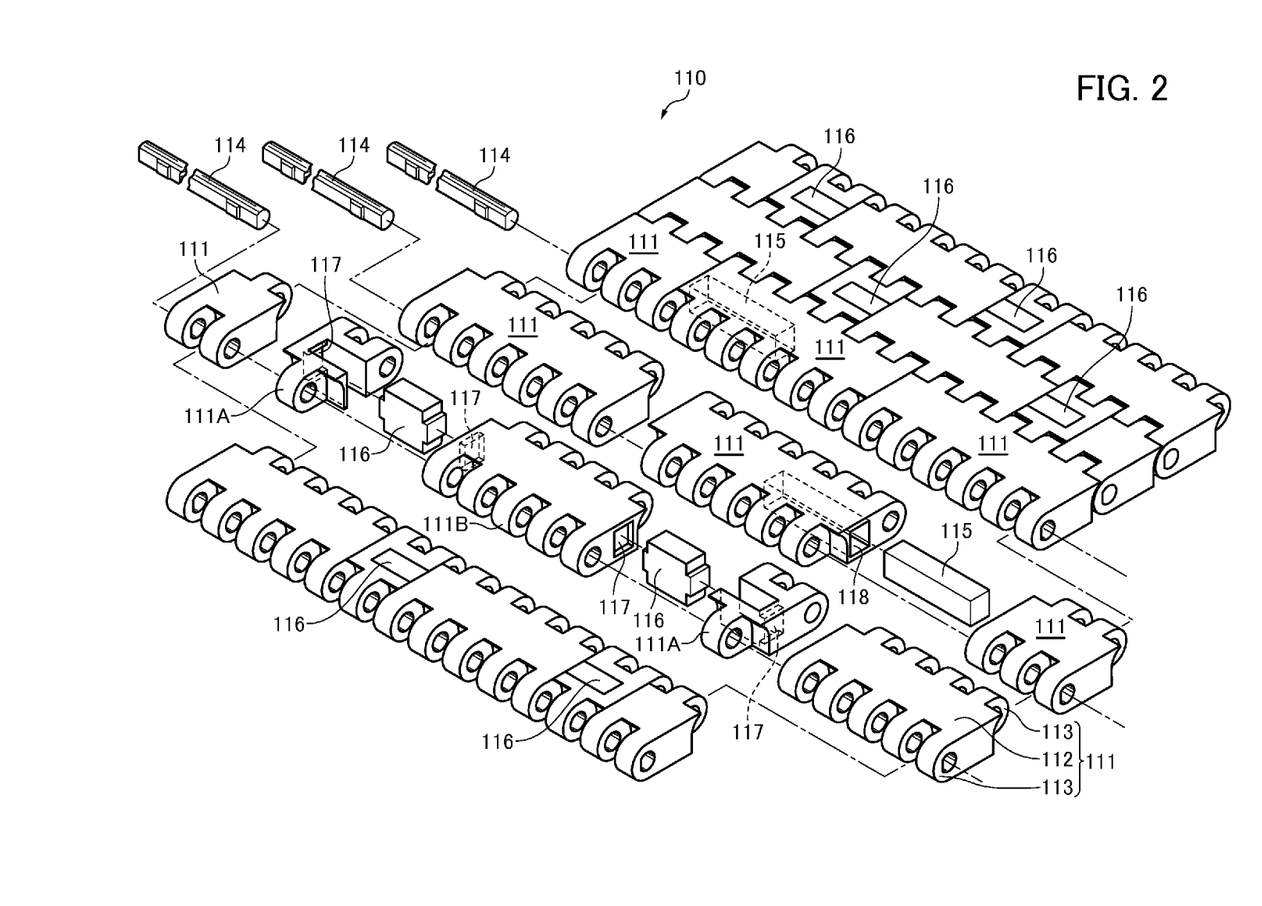
FIG. 2 is a perspective assembly and exploded view of a conveyor chain of the first embodiment of the invention.
Figure 3:
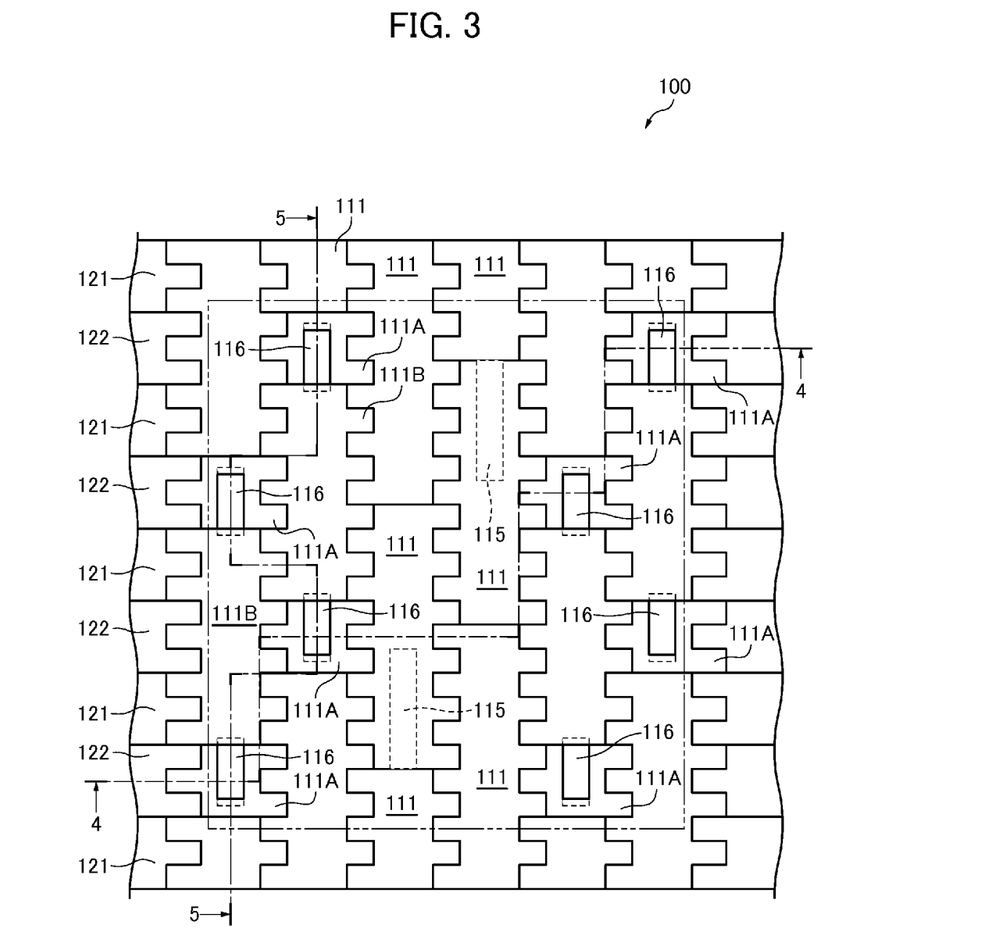
FIG. 3 is a plan view of the chain conveyor apparatus of the first embodiment of the invention.
Figure 4:
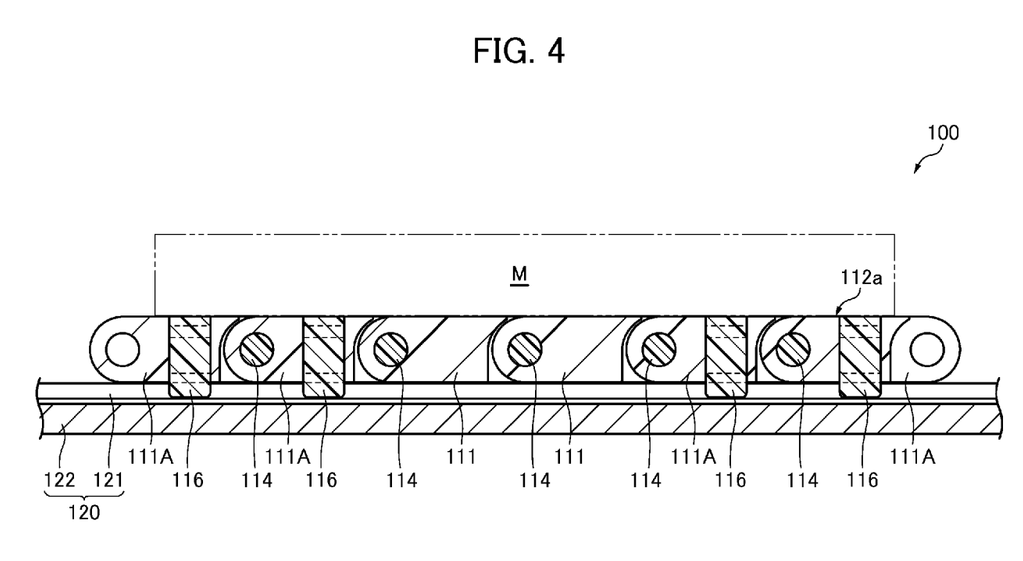
FIG. 4 is a section of the chain conveyor apparatus taken along a line 4-4 indicated in FIG. 3.
Figure 5:
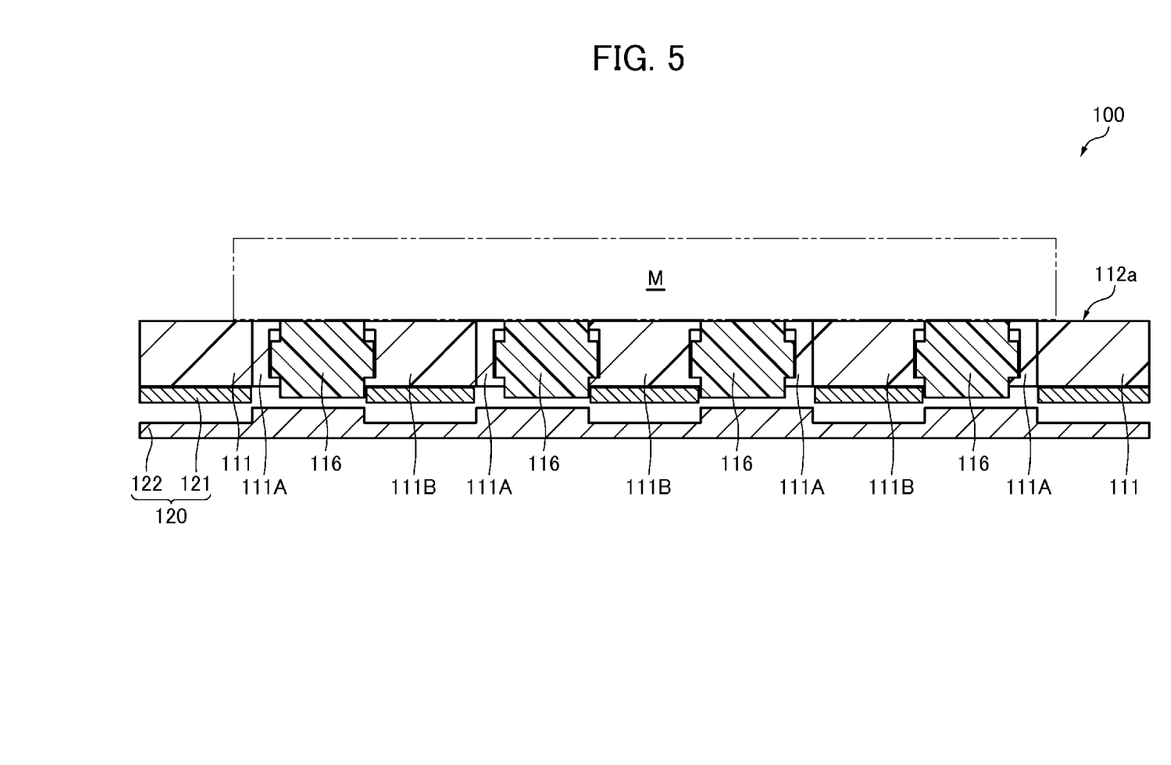
FIG. 5 is a section view of the chain conveyor apparatus taken along a line 5-5 indicated in FIG. 3.
Figure 6:
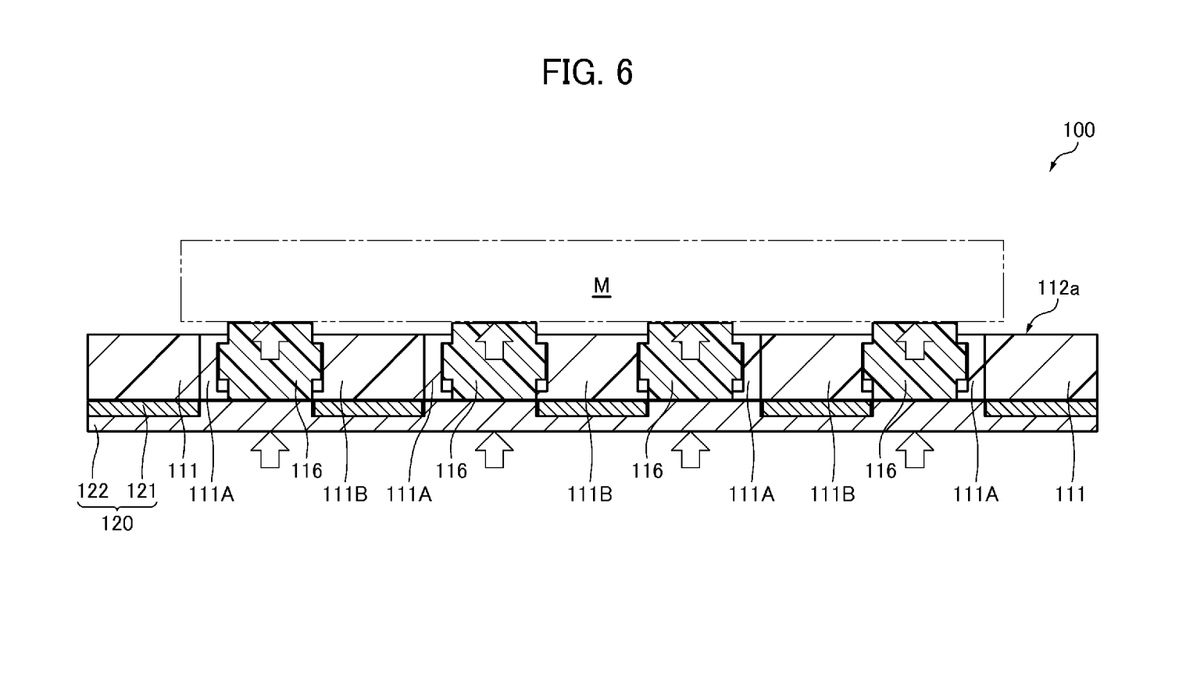
FIG. 6 is a section view illustrating a condition in which a movable push-up rail shown in FIG. 5 is pushed up in a vertical direction.
Figure 7:
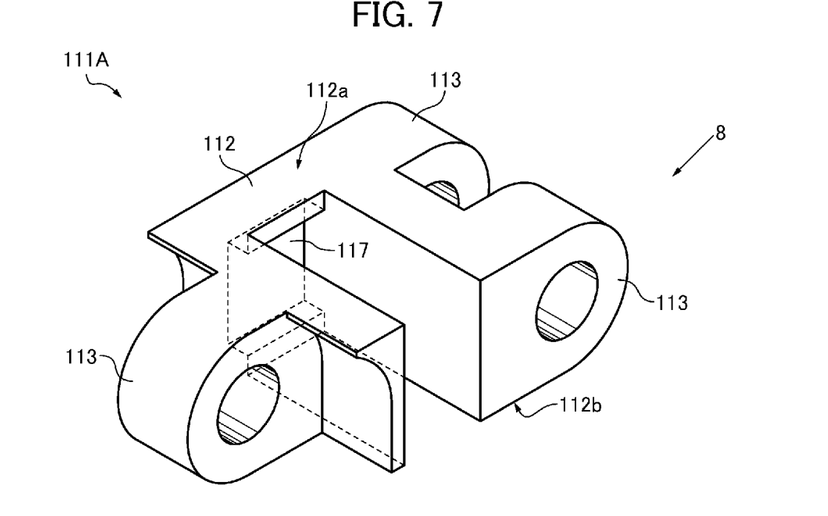
FIG. 7 is a perspective view showing a synthetic resin link module having an attraction detaching piece shown in FIG. 2.
Figure 8:
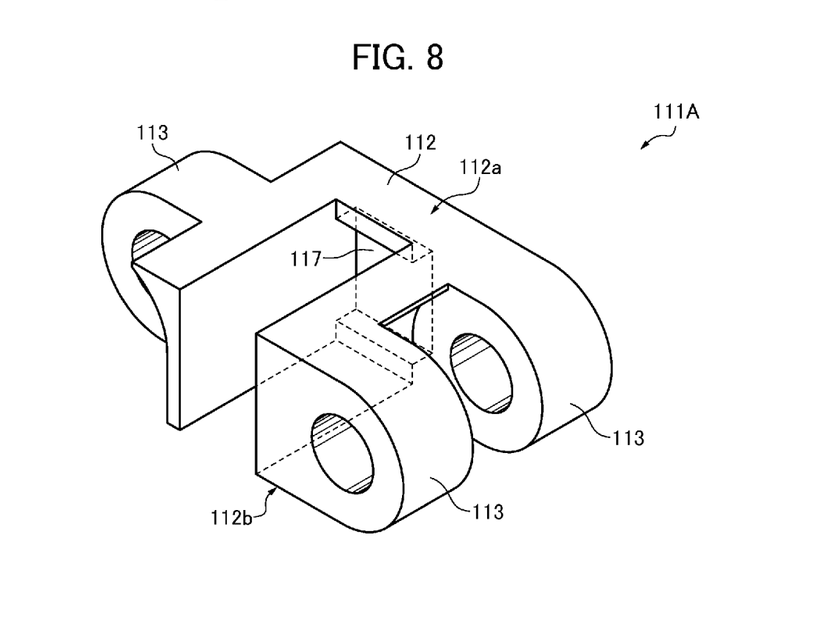
FIG. 8 is a perspective view of the synthetic resin link module viewed from an arrow indicated in FIG. 7.

FIG. 1 is a general view showing a mode of use of the chain conveyor apparatus 100 of a first embodiment of the invention. FIG. 2 is a perspective assembly and exploded view of a conveyor chain 110 of the first embodiment of the invention. FIG. 3 is a plan view of the chain conveyor apparatus 100 of the first embodiment. FIG. 4 is a section of the chain conveyor apparatus 100 taken along a line 4-4 indicated in FIG. 3. FIG. 5 is a section view of the chain conveyor apparatus 100 taken along a line 5-5 indicated in FIG. 3. FIG. 6 is a section view illustrating a condition in which a movable push-up rail 122 shown in FIG. 5 is pushed up in a vertical direction. FIG. 7 is a perspective view showing a synthetic resin link module 111 accommodating an attraction detaching piece 116 shown in FIG. 2. FIG. 8 is a perspective view of the synthetic resin link module 111 viewed from an arrow 8 indicated in FIG. 7.

As shown in FIG. 1, the chain conveyor apparatus 100 of the first embodiment basically includes the conveyor chain 110. FIG. 2 illustrates the conveyor chain 110 composed of a large number of synthetic resin link modules 111. Each of the resin link modules includes a loading portion 112 for loading articles M. Each of the resin link modules includes hinge knuckles 113 projecting from front and rear ends of the loading portion 112. Link pins 114 are inserted into the hinge knuckles 113 to connect the link modules 111 in a chain longitudinal direction.

Referring to FIG. 1, driving and driven sprockets S1 and S2 are illustrated. Conveyor chain 110 wraps around the sprockets. The chain conveyor apparatus 100 conveys the articles M upward on a slope as indicated by an arrow in FIG. 1.

Chain conveyor apparatus 100 also includes a stopper St provided swingably to accumulate the articles M. Chain conveyor 100 also includes a return roller R provided at a return side of the conveyor chain.

Next, configurations of an attraction detaching piece 116 and a projection driving mechanism 120, which are the most characteristic parts of the chain conveyor apparatus 100 of the present embodiment, will be described in detail with reference to the drawings.

That is, as shown in FIGS. 2 through 5, two synthetic resin link modules 111A among a plurality of synthetic resin link modules 111 that compose each link row of the conveyor chain 110 have the attraction detaching pieces 116. The attraction detaching piece 116 is configured to detach and release articles M by pushing up the articles M from a loading surface 112a against the magnetic force applied to the metallic articles.

The projection driving mechanism 120 that pushes the attraction detaching pieces 116 so as to project out of the loading surface 112a of the synthetic resin link modules 111 is provided on the inner circumferential side of the conveyor chain 110 in the chain longitudinal direction.

The attraction detaching pieces 116 are built in the synthetic resin link modules 111A and the projection driving mechanism 120 is disposed underneath a straight portion of the conveyor chain 110 on the inner circumferential side thereof. The projection driving mechanism 120 pushes the attraction detaching pieces 116 upwardly against the articles M releasing them from the loading surface 112a of the conveyor chain 110 as illustrated in FIG. 6. When the articles M are released, they are accumulated, i.e., temporarily retained, on the inclined conveying area of the conveyor chain 110.

Two attraction detaching pieces 116 are disposed in each link row in the chain width direction in the present embodiment. Other patterns and other numbers of attraction detaching pieces 116 may be used in accordance to size of the article M. The pattern of attraction detaching pieces may include any pattern as desired depending on the size and shape of the article M. The attraction detaching pieces may include one or more attraction detaching pieces disposed in the chain longitudinal direction or the chain width direction. The attraction detaching pieces may be disposed in the center portion of the conveyor chain. The attraction detaching pieces may be disposed on both sides of the conveyor chain 110.

FIGS. 7 and 8 illustrate the synthetic resin link module 111A whose loading portion 112 is partially cut away along the chain width direction. Synthetic resin link modules 111A, 111B include, in the chain width direction, slide groove portions 117 for sliding both right and left ends of the attraction detaching piece 116 upwardly and downwardly within the synthetic resin link modules 111A, 111 B as shown in FIG. 2.

With this arrangement, synergistically with a self-lubricant function of the synthetic resin link modules 111A, 111B, the attraction detaching piece 116 can be smoothly pushed upwardly such that it protrudes out of the loading surface 112a of the conveyor chain 110 at a predetermined accumulation position across the chain width direction. Thus, the article M is detached and released from the loading surface 112A of the conveyor chain 110.

The projection driving mechanism 120 described above includes five fixed guide rails 121 spaced from each other in parallel on the inner circumferential side of the conveyor chain 110 along the chain longitudinal direction. The conveyor chain slidably travels over and along the fixed guide rails 121. One movable push-up rail 122 is configured to push up the attraction detaching pieces 116 disposed between the fixed guide rails 121 such that they protrude from the loading surface 112a of the synthetic resin link modules 111 as illustrated in FIG. 6.

With this arrangement, even if the conveyor chain 110 rises and falls as it traverses the straight conveying portion due to polygonal movement caused by engagement with the driving sprocket Si, the fixed guide rails 121 steadily receive and support the traveling conveyor chain 110. The movable push-up rail 122 projects the attraction detaching pieces 116 in and out of the loading surface 112a of the synthetic resin link module 111A between the fixed guide rails 121 to detach and release the article M loaded on the conveyor chain 110.

Although the fixed guide rails 121 extend between the driving and driven sprockets S1 and S2 as shown in FIG. 1 in the present embodiment, they may be provided intermittently between the driving and driven sprockets S1 and S2 as long as they can support the conveyor chain 110.

As shown in FIG. 2, each magnet piece 115 is built in the synthetic resin link module 111 and is not in contact with the article M. Magnet piece is accommodated within a magnet accommodating blind hole 118 open to a link side surface of the synthetic resin link module 111.

The loading surface 112a of the synthetic resin link module 111 is flat so as to convey the article M while securely supporting it.

The chain conveyor apparatus 100 of the present embodiment is configured as described above and includes the synthetic resin link modules 111A, 111B each having the attraction detaching piece 116 that detaches and releases the article M by pushing up the article M from the loading surface 112a. The projection driving mechanism 120 projects the attraction detaching piece 116 out of the loading surface 112a in straight portion of the inner circumferential side of the conveyor chain 110 along the chain longitudinal direction.

With this arrangement, it is possible to dam up and to simply and temporarily retain the article M by using the stopper St at the accumulation position. The accumulation position is in the inclined conveying portion of the conveyor chain. The power applied to the conveyor chain 110 is reduced when the articles M are detached and released from the conveyor chain 110 at the accumulation position.

The attraction detaching pieces 116 are built in the rows of the synthetic resin link modules. The projection driving mechanism 120 is built in the straight area on the inner circumferential side of the conveyor chain. It is not necessary to provide a space for installing the attraction detaching pieces 116 and the projection driving mechanism 120 separately on the loading surface of the conveyor chain or in a straight area on the outer circumferential side of the conveyor chain, which thus allows the accumulation operating environment to be realized easily and simply.

This arrangement is provided with the pair of right and left slide groove portions 117 for sliding both right and left ends of the attraction detaching piece 116 within the synthetic resin link modules 111. Article M can be released from the magnetic force of the magnet piece 115 built within the conveyor chain 110. Additionally, the articles can be freely accumulated. Thus, the advantageous effects of this arrangement are remarkable.

(Second Embodiment)

Figure 9:
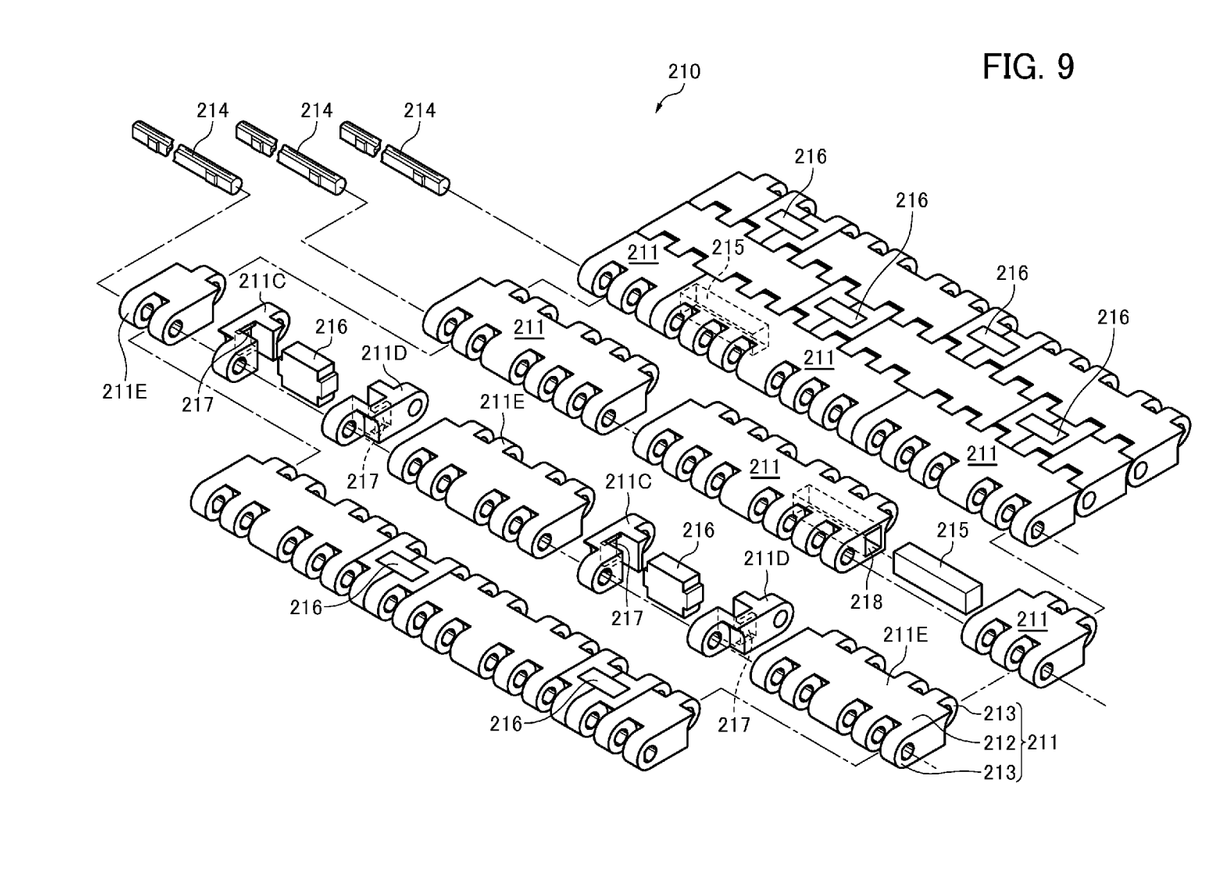
FIG. 9 is a perspective assembly and exploded view of a conveyor chain of a second embodiment of the invention.
Figure 10:
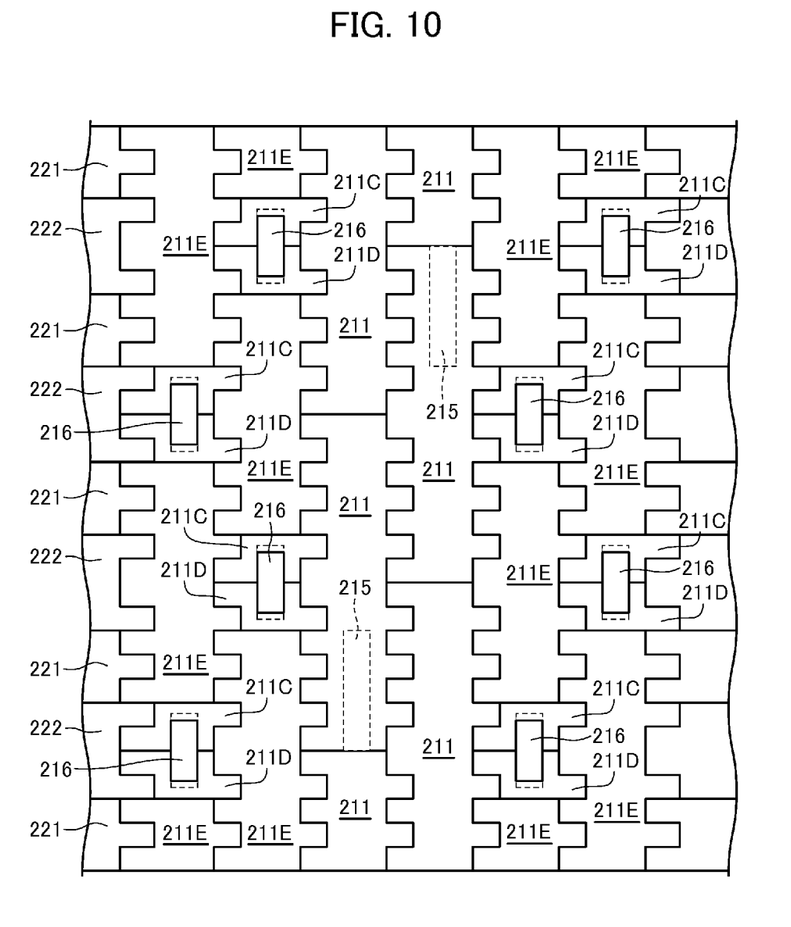
FIG. 10 is a plan view of the chain conveyor apparatus according to the second embodiment of the invention.
Figure 11:
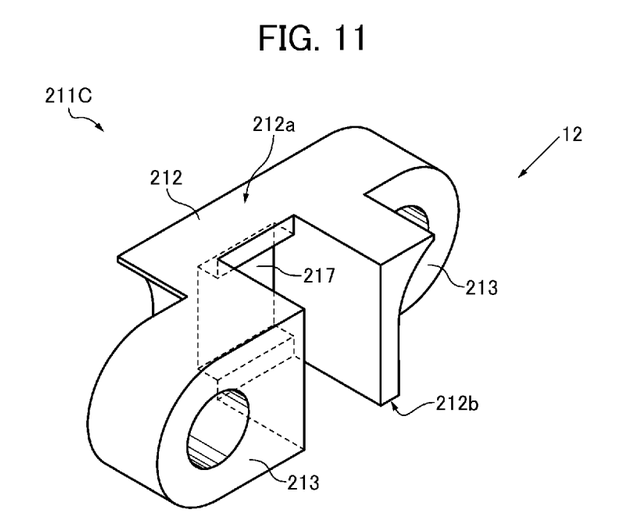
FIG. 11 is a perspective view of a synthetic resin link module having an attraction detaching piece shown in FIG. 9.
Figure 12:
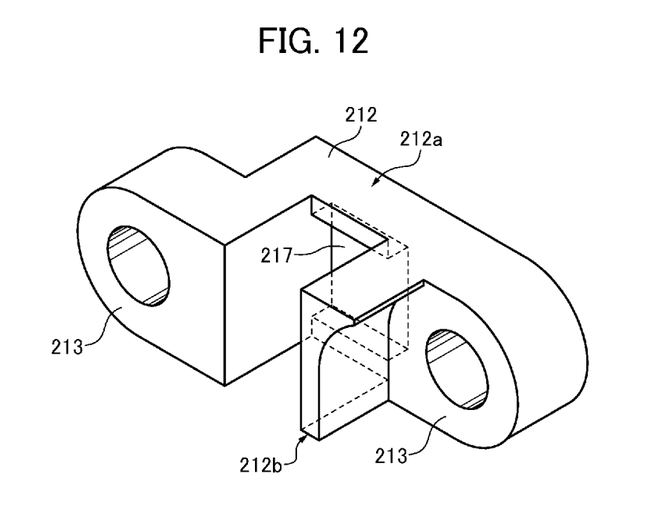
FIG. 12 is a perspective view of the synthetic resin link module shown in FIG. 11 viewed from an arrow.

A chain conveyor apparatus 210 of a second embodiment of the invention will be described with reference to the drawings. FIG. 9 is a perspective assembly and exploded view of a conveyor chain 210 of the second embodiment of the invention. FIG. 10 is a plan view of a chain conveyor apparatus of the second embodiment. FIG. 11 is a perspective view of a synthetic resin link module 211 accommodating an attraction detaching piece 216 shown in FIG. 9. FIG. 12 is a perspective view of the synthetic resin link module 211 viewed from an arrow 12 in FIG. 11.

As compared to the configurations of the chain conveyor apparatus 100 of the first embodiment described above, configurations and parts of the chain conveyor apparatus 210 of the second embodiment are basically the same. The configuration of a synthetic resin link module 211 accommodating an attraction detaching piece 216 is described herein such that the same or corresponding members of the chain conveyor apparatus 210 as described above in connection with the apparatus 100 will be denoted by the corresponding reference numerals in 200s and an overlapped explanation thereof will be omitted here.

FIGS. 9 through 12 illustrate a pair of right and left synthetic resin link modules 211C and 211D. Each module has a shape symmetrical to each other for accommodating the attraction detaching piece 216. The modules have right and left slide groove portions 217, respectively, which enable sliding of the ends of the attraction detaching piece 216 within the groove. In other words, the attraction detaching piece moves generally from the back surface 212b to the loading surface 212a within the synthetic resin link modules 211C and 211D.

With this arrangement, synergistically with a self-lubricant function of the synthetic resin link modules 211C and 211D, the attraction detaching piece 216 can be smoothly pushed out of the loading surface 212a of the conveyor chain 210 at a predetermined accumulation position across the chain width direction. When the attraction detaching pieces 216 are pushed upwardly they instantly detach and release the article M from the loading surface 212a of the conveyor chain 210. This arrangement does not require a stop mechanism for stopping the attraction detaching piece 216 other than that provided in modules 211C, 211D. Synthetic resin link modules 211E neighbor widthwise to the synthetic resin link modules 211C and 211D, and allows the conventional synthetic resin link modules to be used as they are.

The chain conveyor apparatus 210 of the present embodiment thus attained can not only bring about the same effects with the chain conveyor apparatus 100 of the first embodiment and allow the articles M to be freely accumulated by releasing the articles M from the magnetic force of the magnet pieces 215 built in the conveyor chain 210, but also reduces the burden of design and manufacturing of the attraction detaching pieces 216 in the conveyor chain 210. Thus, the advantageous effects of the present embodiment are remarkable.

The chain conveyor apparatus of the invention may take any configuration as long as it includes:

a large number of synthetic resin link modules;

each link module includes a loading portion and loading surface for loading articles;

each link module includes hinge knuckles projecting from the front and rear ends of the loading portion;

link pins inserted into the hinge knuckles of the link modules to connect the link modules in the chain longitudinal direction;

magnet pieces built in the conveyor chain to convey the articles while attracting and retaining the articles on the loading surface of the synthetic resin link modules by the magnetic force of the magnet pieces;

the attraction detaching pieces are built in the plurality of synthetic resin link modules to detach and release the articles attracted and retained by the magnetism by pushing up the articles from the loading surface; and, the projection driving mechanism provided in the straight area on the inner circumferential side of the conveyor chain along the chain longitudinal direction to project the attraction detaching pieces in and out of the loading surface of the synthetic resin link modules.

Thus, the chain conveyor apparatus simply and readily realizes the accumulation operating environment that allows the articles to be readily dammed up and temporarily retained at the accumulation position such as the inclined conveying area/portion, and allows reduction of the power applied to the conveyor chain.

A specific material of the synthetic resin link module used for the conveyor chain of the invention may be any material as long as it is synthetic resin having favorable mechanical properties and molding accuracy, such as polyamide resin, polyester resin, polyacrylic resin, polyacetal resin, polyvinyl chloride resin, polystyrene resin and others.

The shape of each of the synthetic resin link modules may be any shape as long as it includes a loading portion for loading articles and hinge knuckles projecting from the front and rear ends of the loading portion. The shape of the modules must further allow the large number of synthetic resin link modules to be connected in the chain longitudinal direction through the link pins inserted into the hinge knuckles.

The synthetic resin link modules may be arranged in any manner as long as the large number of synthetic resin link modules is connected at least in the chain longitudinal direction by the link pins inserted into the hinge knuckles. For example, the large number of synthetic resin link modules may be disposed in a line and connected with each other in the chain longitudinal direction by the link pins inserted into the hinge knuckles. For another example, the large number of synthetic resin link modules may be disposed in the chain longitudinal direction and chain width direction and connected with each other by the link pins inserted into the hinge knuckles.

The plurality of attraction detaching pieces built into the conveyor chain of the invention may be arranged in any manner such as those disposed continuously or intermittently in the chain longitudinal direction or the chain width direction, or those disposed at the center or both sides of the conveyor chain.

The configuration of the synthetic resin link modules for housing the attraction detaching pieces therein may include:

a pair of right and left slide groove portions for sliding both right and left ends of the attraction detaching piece generally from the back surface of the synthetic resin link module to the loading surface of the synthetic resin link module within each synthetic resin link module wherein the attraction detaching piece straddles the synthetic resin link modules neighboring in the chain width direction of the conveyor chain; or, a pair of right and left slide groove portions for sliding both right and left ends of the attraction detaching piece generally from the back surface of the synthetic resin link module to the loading surface of the synthetic resin link module is constructed within a module unit of the synthetic resin link modules composing the conveyor chain.

The configuration for building the magnet pieces in the conveyor chain of the invention may be any configuration as long as the magnet pieces attract and retain the articles on the loading surface by their magnetism. That is, the magnet pieces may be accommodated within accommodating containers mounted on sides of the conveyor chain, may be buried in the loading surface of the synthetic resin link modules, or may be accommodated within accommodating holes concaved on the loading surface of the synthetic resin link modules.

A specific material of the magnet piece used in the conveyor chain of the invention may be any magnet, such as a rare-earth magnet, ferrite magnet or the like, as long as it is a permanent magnet that can assure a magnetic force necessary for attracting and retaining the articles.

What is claimed is:

1. A chain conveyor apparatus comprising:
   a conveyor chain;
   said conveyor chain includes a longitudinal direction;
   said conveyor chain includes a plurality of synthetic resin link modules;
   said plurality of synthetic resin link modules is arranged in a plurality of rows;
   said plurality of rows of said synthetic resin link modules are articulately connected to each other in said longitudinal direction enabling said rows to form a flexional circumferential bend having a flexional inner circumferential side and flexional outer circumferential side;
   each of said plurality of rows of said synthetic resin link modules includes a flexional inner circumferential side residing during bending on said flexional inner circumferential side of said bend;
   each of said plurality of rows of said synthetic resin link modules includes an outer circumferential side residing during bending on said outer flexional circumferential side of said bend;
   each of said rows of said synthetic resin link modules includes a surface for loading articles thereon;
   each of said synthetic resin link modules includes front and rear ends thereof;
   each of said front and rear ends of said synthetic resin link modules include hinge knuckles projecting from said front and rear ends of said synthetic resin link modules;
   a plurality of link pins, each of said plurality of said link pins inserted into said respective hinge knuckles of said link modules to articulately connect said rows of said link modules in said conveyor chain longitudinal direction;
   a plurality of magnet pieces;
   each of said plurality of magnet pieces resides in said link modules of said conveyor chain;
   said articles being coupled to said surface of said rows of said synthetic resin link modules by the magnetic force of said magnet pieces;
   a plurality of attraction detaching pieces;
   each of said plurality of said attraction detaching pieces movably reside in said rows of said plurality of synthetic resin link modules;
   a projection driving mechanism;
   said projection driving mechanism resides in proximity to said inner circumferential side of said conveyor chain along said chain longitudinal direction;
   said projection driving mechanism engages and moves said attraction detaching pieces in and out of said surface of said rows of said synthetic resin link modules; and,
   said attraction detaching pieces engaging and urging said articles out of engagement with said surface of said rows of said synthetic resin link modules against said magnetic force of said magnets and releasing said articles from said surface of said rows of said synthetic resin link modules.

2. The chain conveyor apparatus according to claim 1, wherein:
   said synthetic resin link modules of said rows include groove portions;
   each of said plurality of said attraction detaching piece portions include right and left ends; and,
   said right and left ends of each of said plurality of said attraction detaching pieces portions slidably reside in said groove portions of said rows of said synthetic resin link modules.

3. The chain conveyor according to claim 1, wherein:
   said projection driving mechanism includes a plurality of fixed guide rails spaced from each other in parallel on said inner circumferential side of said conveyor chain along said chain longitudinal direction;
   said conveyor chain slidably travels along said guide rails;
   a movable push-up rail disposed across said fixed guide rails;
   said attraction detaching pieces reside between said fixed guide rails;
   said movable push-up rail upwardly urges said attraction detaching pieces into engagement with said articles and releases said articles from said surface of said rows of synthetic resin link modules.

4. The chain conveyor apparatus according to claim 1, wherein:
   each of said magnet pieces resides in said rows of synthetic resin link modules and does not contact said article.

* * * * *

UNITED STATES PATENT AND TRADEMARK OFFICE
CERTIFICATE OF CORRECTION

| | | |
|---|---|---|
| PATENT NO. | : 8,695,784 B2 | Page 1 of 1 |
| APPLICATION NO. | : 13/896307 | |
| DATED | : April 15, 2014 | |
| INVENTOR(S) | : Ota | |

It is certified that error appears in the above-identified patent and that said Letters Patent is hereby corrected as shown below:

In the Specification

Col. 6, line 26, after "sprocket" delete "Si," and insert -- S1, -- therefor.

Signed and Sealed this
Twenty-first Day of October, 2014

Michelle K. Lee
*Deputy Director of the United States Patent and Trademark Office*